United States Patent
Pich et al.

(10) Patent No.: US 9,422,122 B2
(45) Date of Patent: Aug. 23, 2016

(54) METHOD FOR LOADING LOOSE IRON ORE PARTIALLY TREATED BY MEANS OF SUPERABSORBENTS

(71) Applicant: S.P.C.M. SA, Andrezieux Boutheon (FR)

(72) Inventors: René Pich, Saint Etienne (FR); Pascal Boehm, Brignais (FR); Gilles Zakosek, Saint Etienne (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days.

(21) Appl. No.: 14/786,845

(22) PCT Filed: Feb. 11, 2014

(86) PCT No.: PCT/FR2014/050263
§ 371 (c)(1),
(2) Date: Oct. 23, 2015

(87) PCT Pub. No.: WO2014/174165
PCT Pub. Date: Oct. 30, 2014

(65) Prior Publication Data
US 2016/0101949 A1 Apr. 14, 2016

(30) Foreign Application Priority Data
Apr. 26, 2013 (FR) ...................................... 13 53826

(51) Int. Cl.
*B65G 60/00* (2006.01)
*C22B 1/244* (2006.01)
*B65G 67/60* (2006.01)
(Continued)

(52) U.S. Cl.
CPC ............. *B65G 67/606* (2013.01); *B01J 20/264* (2013.01); *C08F 20/06* (2013.01); *C08F 20/56* (2013.01); *C22B 1/244* (2013.01)

(58) Field of Classification Search
CPC ....... B65G 67/606; B01J 20/264; C08F 20/56
USPC .......................... 414/803, 137.5, 137.9–139.3
See application file for complete search history.

(56) References Cited

U.S. PATENT DOCUMENTS 3,198,353 A * 8/1965 McDowell ........... B65G 63/008
198/580
3,693,795 A * 9/1972 Robinson ................ B65G 53/30
210/242.1

(Continued)

FOREIGN PATENT DOCUMENTS

| DE | 19643364 A1 * | 4/1998 | ............. B09C 1/085 |
| FR | 2712306 A1 | 5/1995 | |
| WO | 2011097357 A1 | 8/2011 | |

OTHER PUBLICATIONS

Italian Document to 2011 A 001028, Publication Date: Sep. 21, 2012.*

(Continued)

*Primary Examiner* — Jeanette E Chapman
(74) *Attorney, Agent, or Firm* — St. Onge Steward Johnston & Reens, LLC

(57) ABSTRACT

A method for loading the hold of an ore carrier with loose ore, according to which the hold is loaded, consecutively, with a portion of the ore treated with a superabsorbent polymer and a portion of the ore not treated with a superabsorbent polymer.

12 Claims, 1 Drawing Sheet

(51) Int. Cl.
  *B01J 20/26* (2006.01)
  *C08F 20/06* (2006.01)
  *C08F 20/56* (2006.01)

(56) References Cited

U.S. PATENT DOCUMENTS

| | | | | |
|---|---|---|---|---|
| 4,065,002 | A | * | 12/1977 | Cunningham ....... B65G 67/606 414/140.9 |
| 4,072,238 | A | * | 2/1978 | Vaughan ................ B63B 27/22 198/669 |
| 5,112,391 | A | | 5/1992 | Owen et al. |
| 5,534,304 | A | * | 7/1996 | Geursen .............. D06M 15/263 427/121 |
| 6,113,844 | A | * | 9/2000 | Neale ...................... C22B 1/244 264/669 |
| 2006/0081348 | A1 | * | 4/2006 | Graef ................ A61F 13/15617 162/141 |

OTHER PUBLICATIONS

International Search Report Application No. PCT/FR2014/050263 Completed: Jun. 2, 2014; Mailing Date: Jun. 12, 2014 2 pages.

* cited by examiner

METHOD FOR LOADING LOOSE IRON ORE PARTIALLY TREATED BY MEANS OF SUPERABSORBENTS

FIELD OF THE INVENTION

The purpose of the invention is a process for loading into the hold of an ore bulk carrier, partially by means of SAPs.

BACKGROUND OF THE INVENTION

The invention concerns maritime transport of ore, in particular iron ore. It is a known fact that this type of transport represents a safety issue. The water contained in the ore can cause the sudden sliding or skidding of the ore in the hold, sometimes causing serious incidents.

Because of the large volumes concerned, iron ore is the first to be concerned, but the same problems can arise with other ores.

The applicant has found a solution to this problem in patent FR 2712306 which proposes to incorporate a superabsorbent polymer (SAP) into the iron ore during loading.

The absorption of water by the polymer, combined with reduced porosity, prevents residual water from migrating towards the bottom of the hold.

Full-scale testing has produced the hoped-for results. However, the process is not widely used because of the cost and the implementation involved. On average, it requires between 50 and 100 tonnes of superabsorbent for between 100 and 150,000 tonnes of damp ore at 7-9%.

In addition, each ore behaves differently because of its particle size, its porosity, the impurity content and the loading method.

In practice, the SEP polymer is added to the conveyor belt used for loading the ship, throughout the loading process, to block the water in the mass.

Recent studies have revealed that despite consistent addition of SAP to the ore, probably because of the swelling speed of the superabsorbent, a large part of the water migrates to the bottom of the hold and can cause incidents at sea.

SUMMARY OF THE INVENTION

The issue to be resolved by the invention is therefore the definition of an ore processing method which can be generalized to every type of ore, eliminating the migration of water to the bottom of the hold, while decreasing the consumption of superabsorbent.

To deal with these problems, the applicant has developed a process for bulk loading into a bulker which improves the stability of the ore transport by the use of a superabsorbent polymer (SAP).

More specifically, the purpose of the invention is a process for loading into the hold of a bulker of which the hold is loaded in succession with part of the ore treated with a superabsorbent polymer (SAP) and part of the ore not treated with a superabsorbent polymer (SAP).

In practice, the part of the ore treated with a superabsorbent polymer (SAP) forms a lower layer spread out over the entire bottom of the hold and the untreated part of the ore forms an upper layer, advantageously spread out over the entire surface of the lower layer.

According to the invention, the lower and upper layers may or may not be of a constant thickness. In particular, as seen in the following, the layers to not need to be plane. Loading is in the form of heaps or small heaps dispensing with the need for a specific bulldozer which would have to be lowered into and raised out of the hold.

According to another characteristic, the ore is treated with variable SAP concentrations. In other words, the lower layer of the bulker can contain different mixtures of the ore with SAP at variable SAP polymer concentrations. In general, the maximum concentration will be at the bottom of the hold. In practice, the volume of ore treated with the SAP represents at the most 70% of the volume in the hold.

According to the invention, the SAP polymers are reticulated polymers derived from the polymerisation of the following hydrosoluble monomers, without any technical limitation:

Non-ionic monomers, advantageously chosen from the group containing acrylamide and its derivatives, N-vinylpyrrolidone, and Acryloyl morpholine.

The anionic monomers preferably chosen from the group containing (meth)acrylic acids and their salts, 2-acrylamido-2-methylpropane sulfonic acid (ATBS) and its salts.

Cationic monomers such as diallyl dimethyl ammonium chloride (DADMAC) and dialkylaminoethyl acrylate (ADAME) and dialkylaminoethyl methacrylate (MADAME), as well as their acidified or quarternised forms.

The applicant has revealed that some polymers could improve the stability of the ore during transport.

These polymers are reticulated copolymers based on acrylamide and acrylic acid, partially or totally neutralized and also based on 2-acrylamido-2-methylpropane sulfonic acid (ATBS) partially or totally neutralized and/or monomers of a hydrophobic nature such as, for instance ethoxylated alkyl (meth)acrylates or ethoxylated alkyl (meth)acrylamides. ATBS also represents generally less than 30% molar content compared to the entirety of the monomers and the hydrophobic monomers less than 5% molar content.

In a preferred embodiment, the SAP has a wide particle size allowing the incorporation of the ore with a delayed effect on loading. Referring to a wide particle size, this means two particle populations being designated, respectively a population of SAP particles less than 1 mm in size and a population of SAP particles with sizes included between 1 and 4 mm. The proportion of the two populations will be adjusted according to the particle size of the ore.

The applicant has also indicated that the addition of a linear hydrosoluble polymer based on acrylamide to the mixture of ore and SAP would improve the stability performances of the ore during transport. Preferably, this polymer will have a molecule weight exceeding 10 million Daltons and will be preferably a copolymer based on acrylamide and sodium acrylate. In this case, the quantity of this linear polymer compared to the SAP will generally be included between 1 and 10% by weight.

Other compounds such as fluidized bentonite or calcium carbonate can be added to the mixture of ore and SAP.

In practice, the mixing of the SAP, optionally of the linear polymer and the other compounds, with the ore is carried out on the conveyor belt transporting the bulk ore into the hold of the bulker. The products are deposited on the ore and vibration and natural mixing ensures that the resulting mix is consistent.

The quantity of SAP polymer mixed into the ore is included between 0.05 and 1% by weight. It will vary according to the height of the hold being filled with the mixture were by the lower part advantageously contains a larger quantity of SAP than the upper part.

The following examples and the attached figures illustrate the invention and the resulting advantages.

DETAILED DESCRIPTION OF THE INVENTION

Figure 1:
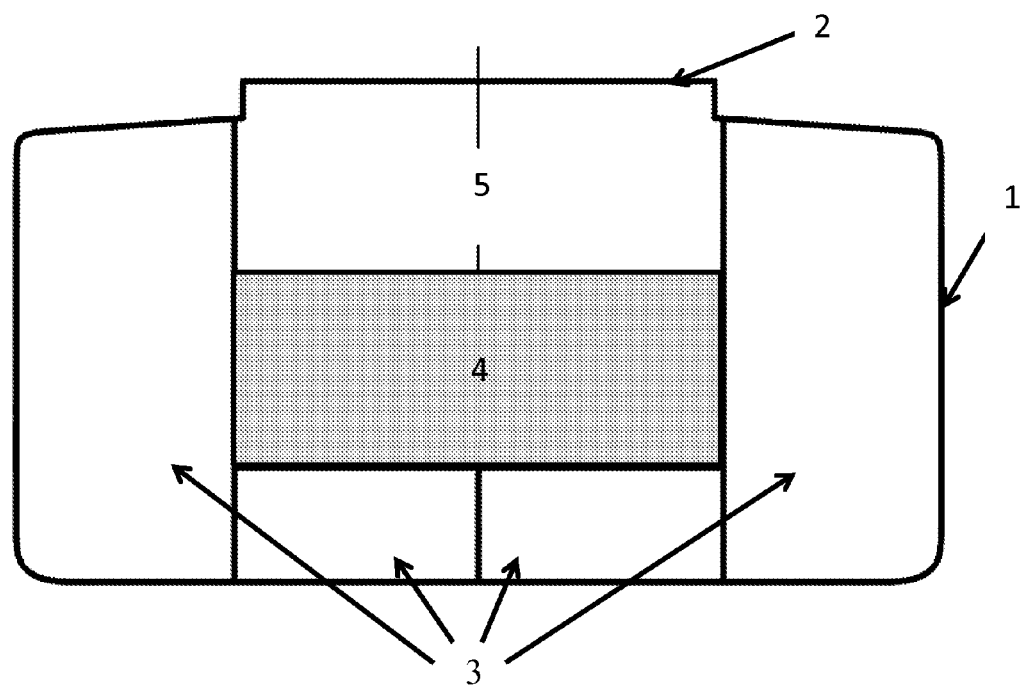
FIGS. 1 and 2 represent a sectional view of the ore carrier hull. Hull (1) contains a hold (2) proper, on either side of which are ballast tanks (3).

FIG. 1 represents an embodiment of the invention in which the lower part (50% vol) of the ore carrier hold is filled with a mixture of ore and SAP (4), while the upper part (5) is filled with ore without SAP.

Figure 2:
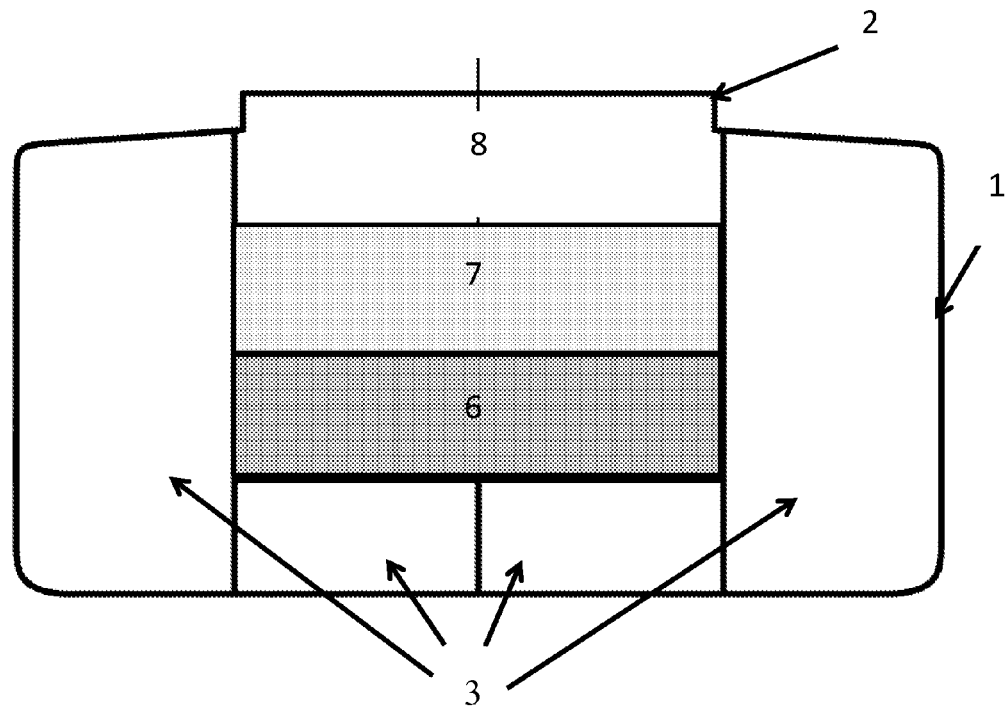

FIG. 2 represents another embodiment of the invention in which the lower part (one third of the volume) of the ore carrier hold is filled with a mixture of ore and SAP in a concentration of 2× (6) and the upper part (8) (one third of the volume) being filled with ore without SAP.

EXAMPLES

Example 1

Prior Art

A 120,000 tonne ore carrier is filled with a mixture of iron ore with 0.2% by weight of an SAP polymer powder of a reticulated acrylamide copolymer and of sodium acrylate (molar ratio in % 70/30). On arrival of the ship, the swollen grains of superabsorbent (SAP) are picked out of the mass of ore and it is found that the SAP from the bottom of the hold has swollen to 80 to 120 times its weight (for theoretical absorption of 300 times) whereas in the upper half, the swelling is only between 10 and 30 times. Therefore, a large amount of the superabsorbent did not produce optimal efficiency.

On the other hand, a "fluidization" phenomenon has taken place at the bottom of the hold where, because of water migration, the relative humidity can rise by 10 or 20%. These problems of "fluidization", in other words the stability of the ore during transport, are a potential cause of incidents at sea.

Three tests were performed according to the process of the invention.

Example 2

SAP Polymer Only in the Lower Part of the Bulker Hold

The same superabsorbent (0.34% by weight) is mixed in the lower half of the ship's hold with the remainder of the load not containing any SAP. At the bottom, swelling is between 50 to 100 times and at the center, in excess of 50 times. Therefore, it appears that this concentration in the lower part of the ship enables more efficient absorption of the water with lower consumption. The average consumption of SAP polymer is 0.17% by weight. The consumption reduction is 15%, considerable on the scale of an ore carrier, rendering the technology more affordable.

Example 3

Distribution of SAP in Two Layers

The lower part of the hold (one third of the volume) is filled with a layer (6) comprising a mixture of iron ore and of the same superabsorbent with a concentration of 0.3% by weight. The intermediate part of the hold (one third of the volume) is then filled with a layer (7) comprising a mixture of ore and of the same superabsorbent with a concentration of 0.15% by weight. The remainder of the hold is filled with ore (8) alone. In all, the average concentration of the load is 0.15% by weight. The results obtained are equivalent to those obtained in example 2 but with a lower SAP consumption. The consumption reduction is 25%.

Example 4

SAP Improved Polymer Combined with Linear Hydrosoluble Polymer

Example 2 was reproduced using another SAP polymer. It was seen that the addition to the ore of 0.26% by weight of SAP polymer, of an acrylamide reticulated copolymer (69.95 mol %), sodium acrylate (27 mol %), ATBS Na (3 mol %) and behenyl 25-ethoxylated methacrylate (0.05 mol %), with a hydrosoluble acrylamide-acrylate polyacrylamide of Na (70/30 mol %) having a molecular weight of 18 millions, again strongly decreases the rate of migration and allows absorption to be homogenized through the depth of the load into which the SAP is added. In this case, the quantity of this linear polymer compared to the SAP is 5% by weight. The average consumption of SAP polymer is 0.13% by weight while that of linear polymer is 0.0065% by weight, so that the total consumption of polymer is 0.1365% by weight. The consumption reduction is 32%.

These are average figures and it is very difficult to carry out accurate analysis into weights ranging between 100 and 150,000 tonnes with the moisture content varying between 7 and 9% for the same load. In particular, the process is particularly valid during the rainy seasons of tropical countries when the ore is both wetted by the rain when it is heaped, and in the course of its being loaded.

This makes it very difficult for the captain of an ore carrier to take the risk of accepting a load when it is difficult not to be sure of it causing "fluidization".

The TML (Transport Moisture Limit) is the moisture limit of the or beyond which it will liquefy, leading to possible risks of ore carrier stability.

The method of determining the TML as described in detail in Appendix 2 of the IMSBC code (INTERNATIONAL MARITIME SOLID BULK CARGOES), entitled: "LABORATORY TEST PROCEDURES, ASSOCIATED APPARATUS AND STANDARDS".

The determining of the TML results in the issuing of a certificate which is considered as a binding legal document for ore carrier transport. The company shipping the ore must demonstrate to the captain of the ship and the maritime authorities that the moisture of the ore it wants to load, at the time of loading, is lower than the calculated and certified TML.

Laboratory tests performed according to the standards of the International Maritime Organization (IMO) for the "Solid Bulk Cargoes Code", sets the standards for solid bulk transport, making it possible to assess the efficiency of the polymer after 20 or 40 days To do this, 15 kg of iron ore are mixed with the SAP polymer and possibly with a linear polymer. Water is added until the humidity of the mixture is brought up to the level of the TML. The resulting mixture is placed in a receptacle which is then placed on a vibrating table. The receptacle is hermetically sealed to avoid any loss of moisture and the drying out of the ore and a 7 kg weight is placed on top of it.

For 20 or 40 days, the table will vibrate for 15 minutes every hour to simulate the shocks sustained inside the hold of a bulker.

Every 3 to 4 days, the cover is removed and a penetration test is performed to check the state of the ore (liquefaction) using the same protocol as the tests performed to determine the TML.

The use of SAP polymers containing AMPS and the mixing of SAP polymers with a linear polymer make for faster absorption of the moisture. The rate of absorption is increased from 20 to 100%. The TML can thus be increased from 3 to 5%, considerable and offering greater latitude in loading the ore bulker. There is no residual water during loading. The ship can be loaded by a heap rather than with plane layers, gaining precious time for the owners of the ore carrier. Loading in layers requires the operation of a bulldozer which has to be lowered and lifted into and out of the hold.

It has been shown that it is possible to reduce by 30%, and probably 50%, the superabsorbent load and therefore cut costs and quantities for a ship by approximately 30 tonnes of SAP. This makes the technology all the more affordable to ore transport companies.

Obviously, the man of the art will be capable of modifying the process, for instance, by using gradually decreasing loads of SAP during the loading process, by greatly increasing the amount of SAP in the bottom layer, by incorporating an SAP containing for instance a load of bentonite producing greater rigidity, starch or urea, giving a faster rate of absorption. The desired goal is always to sufficiently block the water to prevent the "fluidization" of the load.

The invention claimed is:

1. A process of loading a hold of a bulker comprising the steps of:
    loading the hold with part a first portion of an ore mixed with a superabsorbent polymer and then, subsequently,
    loading the hold with a second portion of said ore not mixed with any superabsorbent polymer.

2. The process according to claim 1, characterized in that the part first portion of the ore mixed with the superabsorbent polymer forms a lower layer spread out over an entire bottom of the hold and the unmixed part second portion of the ore forms an upper layer.

3. The process according to claim 1 characterized in that the ore is mixed with variable concentrations of superabsorbent polymer.

4. The process according to claim 1, characterized in that a volume of ore treated with the superabsorbent polymer represents at the most 70% of a total volume of ore in the hold.

5. The process according to claim 1 characterized in that the superabsorbent polymer comprises reticulated copolymers based on acrylamide and acrylic acid, partially or totally neutralized and also based on 2-acrylamido-2-methylpropane sulfonic acid partially or totally neutralized and/or monomers of a hydrophobic nature.

6. The process according to claim 1 characterized in that the superabsorbent polymer contains a population of particles having a size smaller than 1 mm and a population of particles with size included between 1 and 4 mm.

7. The process according to claim 1 characterized in that the quantity of superabsorbent polymer mixed into the ore is included between 0.05 and 1% by weight.

8. The process according to claim 1 characterized in that the ore is mixed with a superabsorbent polymer and a linear hydrosoluble polymer based on acrylamide.

9. The process according to claim 8 characterized in that the linear hydrosoluble polymer has a molecular weight in excess of 10 million daltons.

10. The process according to claim 8 characterised in that the quantity of linear polymer compared to the superabsorbent polymer is included between 1 and 10% by weight.

11. The process according to claim 2, characterized in that the unmixed second portion of the ore forms an upper layer spread out over an entire surface of the lower layer.

12. The process according to claim 5, characterized in that the superabsorbent polymer comprises at least one of ethoxylated alkyl (meth)acrylates and ethoxylated alkyl (meth)acrylamides.

* * * * *